(12) United States Patent
Min

(10) Patent No.: US 8,462,122 B2
(45) Date of Patent: Jun. 11, 2013

(54) APPARATUS FOR CONTROLLING DIGITAL DEVICE BASED ON TOUCH INPUT INTERFACE CAPABLE OF VISUAL INPUT FEEDBACK AND METHOD FOR THE SAME

(75) Inventor: Dong Jin Min, Seoul (KR)

(73) Assignee: MELFAS, Inc., Seoul (KR)

( * ) Notice: Subject to any disclaimer, the term of this patent is extended or adjusted under 35 U.S.C. 154(b) by 569 days.

(21) Appl. No.: 11/921,856

(22) PCT Filed: Aug. 8, 2005

(86) PCT No.: PCT/KR2005/002578
§ 371 (c)(1),
(2), (4) Date: Dec. 10, 2007

(87) PCT Pub. No.: WO2006/135127
PCT Pub. Date: Dec. 21, 2006

(65) Prior Publication Data
US 2009/0090568 A1    Apr. 9, 2009

(30) Foreign Application Priority Data
Jun. 14, 2005 (KR) .................. 10-2005-0050656

(51) Int. Cl.
*G06F 3/041* (2006.01)

(52) U.S. Cl.
USPC .......................... 345/173; 345/170

(58) Field of Classification Search
USPC ........ 345/156, 157, 167, 170, 173; 178/18.06
See application file for complete search history.

(56) References Cited

U.S. PATENT DOCUMENTS 6,846,579 B2 * 1/2005 Anderson et al. ............. 428/690
7,205,979 B2 * 4/2007 Zimmerman et al. ........ 345/158

(Continued)

FOREIGN PATENT DOCUMENTS

EP 1 098 241 A 5/2001
EP 1 251 455 A 10/2002

(Continued)

OTHER PUBLICATIONS

Chinese Office Action, with English translation, issued in Chinese Patent Application No. 200580050028.5, mailed Mar. 6, 2009.

(Continued)

*Primary Examiner* — Quan-Zhen Wang
*Assistant Examiner* — Calvin C Ma
(74) *Attorney, Agent, or Firm* — McKenna, Long & Aldridge, LLP.

(57) ABSTRACT

The present invention relates to an apparatus and method for controlling a digital device, which controls the digital device by using a sensor sensing a touch of a human body, and more particularly, to an apparatus and method for controlling a digital device, which controls a digital device via a touch sensor and provides feedback information based on touch information of a sensor. The digital device control apparatus comprises a sensor including a plurality of touch-sensitive switches separated from each other by a certain distance and sensing user's touch on the touch-sensitive switches for generating touch information; a control information generating unit generating control information for controlling the mobile device based on the touch information; a control unit controlling the mobile device according to the generated control information; a feedback information generating unit generating feedback information based on the touch information; and a plurality of light-emitting devices visually displaying the feedback information to the user corresponding to the plurality of the touch-sensitive switches. According to the present invention, the user may clearly recognize the plurality of the touch-sensitive switches being touched.

21 Claims, 7 Drawing Sheets

U.S. PATENT DOCUMENTS

| | | | |
|---|---|---|---|
| 7,210,618 B2* | 5/2007 | Dong | 235/375 |
| 7,240,093 B1* | 7/2007 | Danieli et al. | 709/205 |
| 2002/0142840 A1* | 10/2002 | Wolinsky | 463/41 |
| 2003/0135292 A1 | 7/2003 | Husgafvel et al. | |
| 2005/0162402 A1* | 7/2005 | Watanachote | 345/173 |

FOREIGN PATENT DOCUMENTS

| | | |
|---|---|---|
| JP | 55-171921 | 12/1980 |
| JP | 61-105928 | 5/1986 |
| JP | 07-226789 A | 8/1995 |
| JP | 2004-120765 | 5/2004 |
| JP | 2004-355606 | 12/2004 |
| KR | 10-2004-0000845 | 1/2004 |
| KR | 10-2004-0073758 | 8/2004 |
| WO | WO 00/02188 A | 1/2000 |
| WO | WO 2004/072837 A1 | 8/2004 |

OTHER PUBLICATIONS

Extended European Search Report issued in European Patent Application No. EP 05773911.2 dated Apr. 24, 2009.

* cited by examiner

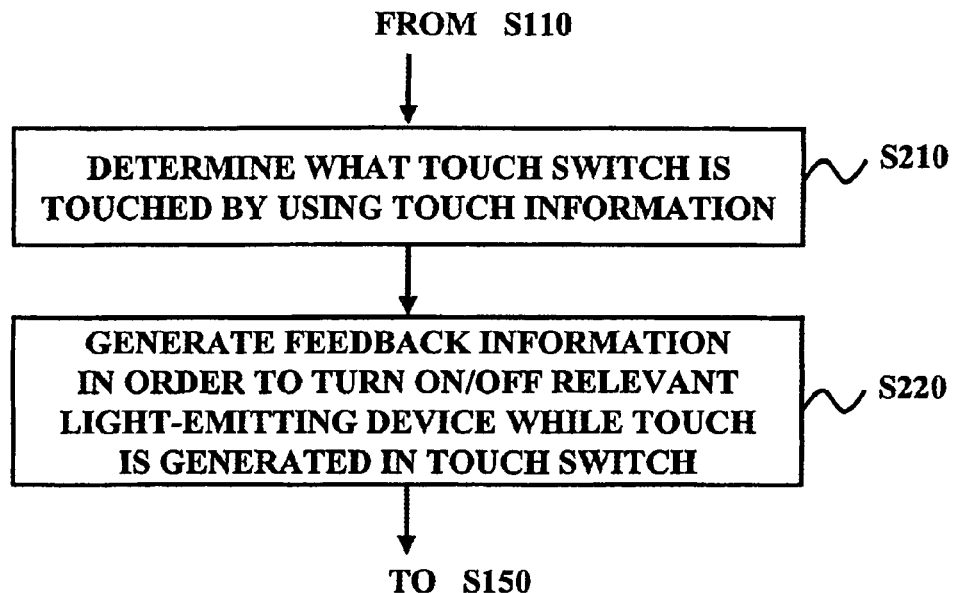
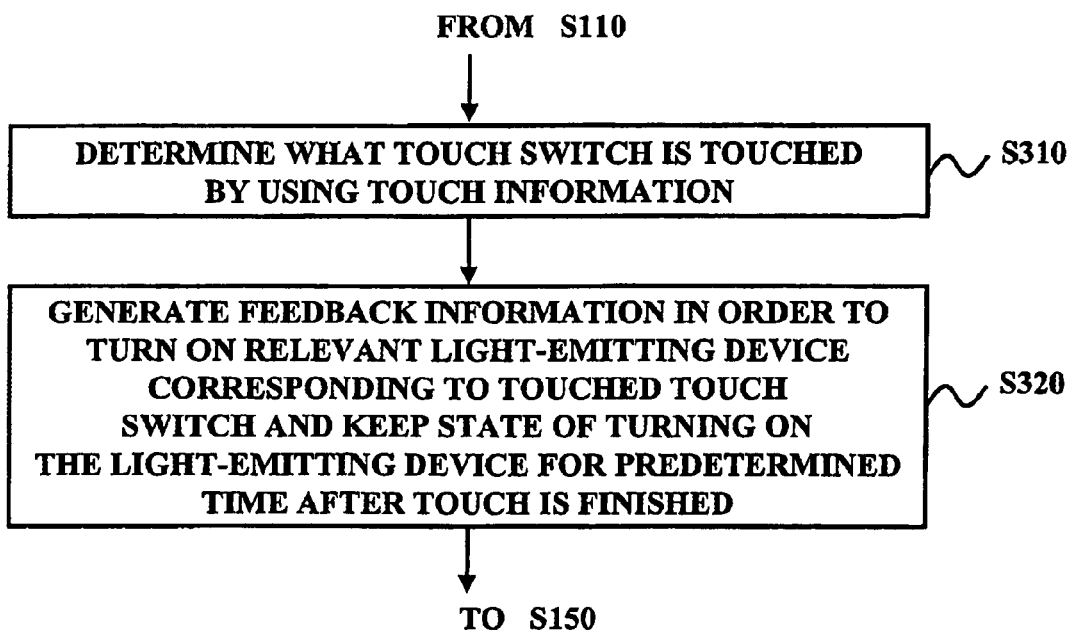

APPARATUS FOR CONTROLLING DIGITAL DEVICE BASED ON TOUCH INPUT INTERFACE CAPABLE OF VISUAL INPUT FEEDBACK AND METHOD FOR THE SAME

RELATED APPLICATIONS

This application is the U.S. National Phase under 35 U.S.C. §371 of International Application No. PCT/KR2005/002578, filed on Aug. 8, 2005, which in turn claims the benefit of Japanese Application No. 10-2005-0050656, filed on Jun. 14, 2005, the disclosures of which Applications are incorporated by reference herein.

TECHNICAL FIELD

The present invention relates to an apparatus and a method of control for digital devices utilizing sensors which can detect a touch of human skin. More specifically, to an apparatus and a method of control for digital devices which provides users with feedback based upon touch sensors, and controlling the digital devices with the touch sensors.

BACKGROUND ART

Today we witness the tendency that more and more functionalities are being integrated into a single digital device, due to the evolution of information communication technology. Hence the digital devices are capable of advanced functionalities, such as multimedia playback, which in turn drives the demand for a novel user interface that can offer more complex functionality while remaining as intuitive as possible.

The components of digital devices must be as compact as possible in order to make the devices lighter and more mobile, and thus requires a user interface that can overcome the limited resources to provide users with maximal convenience.

Touch-sensitive switches that perform a switching action based upon the touch information with human skin are becoming increasingly prevalent nowadays. Touch-sensitive switches are gradually replacing earlier mechanical switches in all sorts of devices, such as floor lamps, since touch-sensitive switches are able to perform switching actions with only a slight contact with human skin.

Touch-sensitive sensors are dramatically superior to mechanical switches, especially in the cases that require a continuous, consecutive input capability such as navigational or scrolling functionality for a graphical user interface. Arrayed touch-sensitive sensors are widely adopted for those applications.

Mechanical switches, in general, offer users a physical feedback in the form of a mechanical stroke or a 'click' sound, which enables the users to recognize the switching action.

However, since a touch-sensitive switch performs a switching action based only on a user's touch, the user may find it difficult to recognize whether a switching action is performed normally. Accordingly, a power switch for a device, such as a floor lamp, where the touch-sensitive switch is adopted, generates a 'beep' sound when the switching action is performed by the user's touch on a touch-sensitive sensor, in order that the user may recognize the switching action.

Particularly, in the case a navigational or a scrolling functionality is provided by combining a plurality of touch-sensitive switches, it becomes more difficult to recognize whether switching actions are normally performed by the touch-sensitive switches since the plurality of touch-sensitive switches perform the switching actions in a short period of time.

Therefore, a method and apparatus enabling a user to effectively recognize a switching action of touch-sensitive switches in the case of controlling a digital device providing complex functionality, such as scrolling, by combining a plurality of the touch-sensitive switches are greatly required.

DISCLOSURE OF INVENTION

Technical Goals

The present invention provides a digital device control apparatus and digital device control method enabling a user to visually recognize a switching action of touch-sensitive switches in a clear manner, in a digital device where a user input is received by a plurality of touch-sensitive switches.

The present invention also provides a digital device control apparatus and digital device control method that is easily embodied in a miniaturized digital device, and conveniently utilized by controlling the digital device with touch-sensitive switches that have corresponding light-emitting devices.

The present invention also provides a digital device control apparatus and digital device control method which helps a user to recognize whether a failure in controlling the digital device is caused by a malfunction of an input interface comprising touch-sensitive switches, or caused by a malfunction of a device control unit. This is done by enabling a user to visually recognize a switching action of the touch-sensitive switches.

Technical Solutions

According to an aspect of the present invention, there is provided a mobile device controlled by a touch input of a user, including: a sensor including a plurality of touch-sensitive switches separated from each other by a certain distance and sensing a touch of the user to the touch-sensitive switches for generating touch information; a control information generating unit generating control information for controlling the mobile device based on the touch information; a control unit controlling the mobile device according to the generated control information; a feedback information generating unit generating feedback information based on the touch information; and a plurality of light-emitting devices visually displaying the feedback information to the user corresponding to the plurality of the touch-sensitive switches.

According to another aspect of the present invention, there is provided an apparatus for controlling a digital device based on a touch input of a user, including: a sensor including a plurality of touch-sensitive switches separated from each other by a certain distance and sensing a touch of the user to the touch-sensitive switches for generating touch information; a feedback information generating unit generating feedback information based on the touch information; and a feedback display unit visually displaying the feedback information to the user.

According to still another aspect of the present invention, there is provided a method of controlling a digital device based on a touch input of a user, including the steps of: generating touch information by sensing a touch of the user to a plurality of touch-sensitive switches separated from each other by a certain distance; generating control information for controlling the digital device based on the touch information; controlling the digital device according to the generated control information; generating feedback information based on the touch information; and visually displaying the feedback information to the user.

BRIEF DESCRIPTION OF DRAWINGS

FIG. 2 is an operation flowchart illustrating an example of the step of generating feedback information illustrated in FIG. 1;

FIG. 3 is an operation flowchart illustrating another example of the step of generating feedback information illustrated in FIG. 1;

BEST MODE FOR CARRYING OUT THE INVENTION

The term "light-emitting device" used in the present specification includes all types of circuit devices emitting light. For example, a light-emitting device may indicate a light-emitting diode.

Hereinafter, a digital device control apparatus and digital device control method controlled based on a touch input of a user will be described in detail with reference to the attached drawings. As an example, the present invention is explained while in a form of being included in a digital device. However, the present invention may be employed in other types of devices, not limited to only digital devices.

Figure 1:
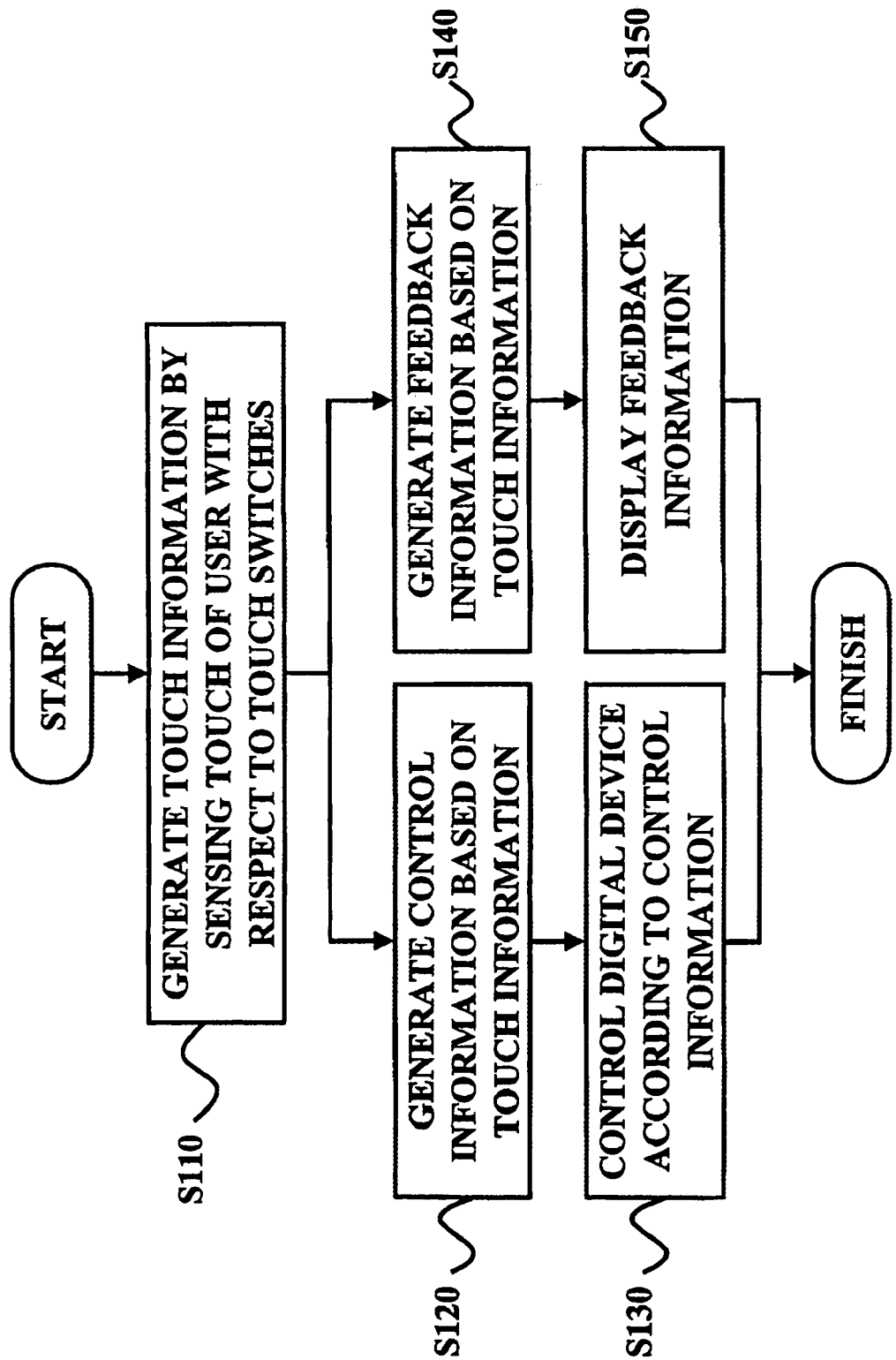
FIG. 1 is an operation flowchart illustrating a method of controlling a digital device, according to an embodiment of the present invention.

FIG. 1 is an operation flowchart illustrating a method of controlling a digital device, according to an embodiment of the present invention.

Referring to FIG. 1, in a digital device control method controlled by a device based on a touch input of a user, touch information is generated by sensing the user's touch on a plurality of touch-sensitive switches separated from each other by a predetermined distance (S110).

In this case, the plurality of touch-sensitive switches include all types of devices which sense a touch of a user relying on physical properties such as heat, pressure, capacitance, and resistance, and convert the touch input into an electrical signal. The touch-sensitive switches may be sensitive to a direct contact with a part of a human body, as well as an indirect contact via a conductor or a nonconductor.

The plurality of the touch-sensitive switches are arranged in a manner of being separated from each other at a predetermined interval or by a certain distance. For example, the touch-sensitive switches may be arranged in a circular shape (on the circumference of a circle). In such an arrangement, a user may control a digital device by rubbing his/her finger either clockwise or counterclockwise on the circularly arranged touch-sensitive switches. As an example, a clockwise rubbing may cause a right or downward scroll of a screen, while a counterclockwise rubbing is interpreted as a left or upward scroll.

The touch-sensitive switches may be arranged in a bar-shape or a cross-shape. For these types of arrangements, a user may also control a digital device by rubbing a finger on the touch-sensitive switches.

The interval between the touch-sensitive switches may be configured with different widths depending upon a type of applications or a degree of convenience provided to users. A narrower interval between the touch-sensitive switches may enable a fine control, while a wider interval and a decrease in a total number of the switches may contribute to a reduction of a production costs and easier routing between the switches.

The touch information is generated by sensing a touch of a user for each touch-sensitive switch and converting touch input into an electrical signal, which may be represented as binary data, gray-scaled data, or full-colored data. The touch information may include data such as whether the switch is touched with a human body, the degree of touch, and a period of time that has elapsed from the last touch, for each touch-sensitive switch. For example, a database may be employed in the digital device to store the touch information, wherein the database includes a "touch recognition" field, a "touch intensity" field, and a "time lapse from the last touch" field, for each touch-sensitive switch.

Also, in the digital device control method, control information is generated on a basis of the touch information for controlling the digital device (S120).

The digital device may be a mobile device such as a mobile phone, a mobile multimedia player such as an MP3 player or a portable multimedia player (PMP), or a mobile game machine. Also, the digital device may fall under any of various kinds of electrical appliances, not limited to mobile devices.

In this case, the control information may include all types of control signals required in the operation of the digital device. For example, the control information may control a display unit or a volume control unit of the digital device.

Also, in the digital device control method, the digital device is controlled according to the control information generated (S130).

In this case, the control of the digital device may be performed in many ways. For example, the digital device may be controlled based on a position where a user touches on, or by recognizing the movement of the touched position. For example, the user may move his/her finger up and down, or clockwise and counterclockwise, to scroll a screen up/down, move a pointer up/down, zoom the screen in/out, or turn the volume up/down.

Also, in the digital device control method, feedback information is generated based on the touch information (S140).

The feedback information is for providing the touch information back to the user, where the touch information is related to a touch input of the user. For example, the feedback information may be a control signal for driving a light-emitting device based on the touch information. For example, in the case each of the touch-sensitive switches has a corresponding light-emitting device which is arranged on a corresponding location, the feedback information may be a control signal for lighting up the light-emitting devices corresponding to the touch-sensitive switches touched.

Also, in the digital device control method, the feedback information is visually displayed to the user (S150).

In operation S150, the feedback information may be displayed to the user by means of a plurality of light-emitting devices. In this case, the light-emitting devices may be light-emitting diodes (LEDs). The light-emitting devices may emit various-colored light.

For the feedback information to be displayed by means of the plurality of the light-emitting devices, the light-emitting devices should be corresponding to a plurality of the touch-sensitive switches. In this case, the correspondence between the touch-sensitive switches and the light-emitting devices may be a one-to-many, a many-to-one, or a one-to-one correspondence. For the one-to-many correspondence, at least two light-emitting devices may blink when a touch is applied on a single touch-sensitive switch. For the many-to-one correspondence, a single light-emitting device may blink based on a touch on at least two touch-sensitive switches. Also, for the one-to-one correspondence, a single light-emitting device may blink based on a touch on a single touch-sensitive switch. A correspondence between the touch-sensitive switches and the light-emitting devices may vary depending on a type of application, size of the digital device, or a user's request.

The light-emitting devices may emit lights of different brightness or different colors depending on the degree of the touch indicated by the touch information of the relevant touch-sensitive switches. For example, in a case the touch-sensitive switch senses a touch based on pressure, a high pressure on the touch-sensitive switch leads to a bright light being emitted from the relevant light-emitting device, while a low pressure leads to a dim light being emitted from the relevant light-emitting device. In another case, a recent touch on a touch-sensitive switch leads to a bright light being emitted from the relevant light-emitting device, and the light becomes dimmer as time elapses since the last touch. In still another case, the lights emitted from the light-emitting devices may have different color or different brightness based on a movement speed of a body such as a finger, where the speed is measured by considering an amount of time from a touch on a certain touch-sensitive switch to a touch on its neighboring switches. As described above, information about pressure on a switch, the time elapsed during a prolonged touch, and a point in time of a touch may be stored as touch information where the touch information is used in generating various forms of feedback information to be presented as various light forms.

It is preferable that the light-emitting devices corresponding to the touch-sensitive switches are located within a predetermined range from the location of the relevant touch-sensitive switches. Namely, a light-emitting device corresponding to a certain touch-sensitive switch may be located closer to the relevant touch-sensitive switch than other light-emitting devices so that the feedback information can be visually displayed to the user to indicate which switch is touched in an intuitive manner.

In operation S150, the feedback information may be displayed to the user in various ways. For example, light-emitting devices such as light-emitting diodes may emit light while relevant touch-sensitive switches are touched by the user. Accordingly, the user may recognize the location of the touch-sensitive switch from which a touch has occurred. In another embodiment, the light-emitting devices may emit light for a predetermined time even after a touch has been removed from the relevant touch-sensitive switches. Accordingly, as in the aforementioned case, the light-emitting devices emit light in association with an amount of time a touch of the user has occurred, the user may recognize the path of the touch-sensitive switches that have been touched, even when the touch has occurred for a very short period of time.

A process may be added for providing a smoother visual impression to the user. As an example, a light-emitting area may be increased by diffusing, refracting, or reflecting light emitted by each light-emitting device, thereby providing a smoother impression to the user.

The feedback information may enable the light-emitting devices to emit light in different forms depending on not only the way of the user performs a touch on the touch-sensitive switch, but also the control state of the digital device. For example, all the light-emitting devices may blink at the same time when the digital device enters a certain mode of operation. For example, the light-emitting devices may blink while a start-up operation is being performed after power is supplied to the digital device.

Furthermore, the feedback information may enable the light-emitting devices to emit light in different forms even for the same touch, depending upon the control state of the digital device. For example, a light-emitting device may emit a red light for a relevant touch-sensitive switch where touch has occurred while the digital device operates in mode A, whereas the same light-emitting device may emit a blue light for the same touch-sensitive switch while in mode B. As another example, a light-emitting device may emit light only while a touch is being applied to the relevant switch in mode A, whereas the light is emitted while a touch is being applied to the relevant switch as well as for a certain period of time even after the touch is removed in mode B.

Each of the operations illustrated in FIG. 1 may be performed in an order as illustrated in FIG. 1, in a reverse order, or at the same time. For example, operations S120 and S130 may be performed at the same time or parallel with operations S140 and S150.

FIG. 2 is an operational flowchart illustrating an example of the operation of generating the feedback information (S140) illustrated in FIG. 1.

Referring to FIG. 2, it is determined which touch-sensitive switch is touched, by using the touch information (S210).

In operation S210, the amount of force of the touch on a switch and a time elapsed from a recent touch as well as which switch receives a touch may be determined for each touch-sensitive switch.

Further, feedback information is generated in order to turn on a light-emitting device corresponding to the touch-sensitive switch while the switch is being touched (S220).

In this case, the feedback information may be generated so that the light-emitting device is turned on with various colors and brightness of lights.

FIG. 3 is a flowchart illustrating another example of the operation of generating the feedback information (S140) illustrated in FIG. 1.

Referring to FIG. 3, it is determined which touch-sensitive switch is touched, by using the touch information (S310).

In operation S310, the intensity of the touch on a switch and a time elapsed from a recent touch as well as which switch is given a touch may be determined for each touch-sensitive switch.

Further, feedback information is generated in order to turn on a light-emitting device corresponding to the touch-sensitive switch while the switch is being touched and even for a certain period of time after the touch is removed (S320).

In this case, the feedback information may be generated so that the light-emitting device is turned on with various colors and brightness of lights.

Accordingly, the user may recognize the path of the touched switches even when a touch has occurred for a very short period of time.

The embodiments of the present invention include a computer-readable medium including a program instruction for executing various operations realized by a computer. The computer readable medium may include a program instruction, a data file, and a data structure, separately or cooperatively. The program instructions and the media may be those specially designed and constructed for the purposes of the present invention, or they may be of the kind well-known and available to those skilled in the art of computer software arts. Examples of the computer-readable media include magnetic media (e.g., hard disks, floppy disks, and magnetic tapes), optical media (e.g., CD-ROMs or DVD), magneto-optical media (e.g., optical disks), and hardware devices (e.g., ROMs, RAMs, or flash memories, etc.) that are specially configured to store and perform program instructions. The media may also be transmission media such as optical or metallic lines, wave guides, etc. including a carrier wave transmitting signals specifying the program instructions, data structures, etc. Examples of the program instructions include both machine code, such as produced by a compiler, and files containing high-level language codes that may be executed by the computer using an interpreter. The hardware elements above may be configured to act as one or more software modules for implementing the operations of this invention.

Figure 4:
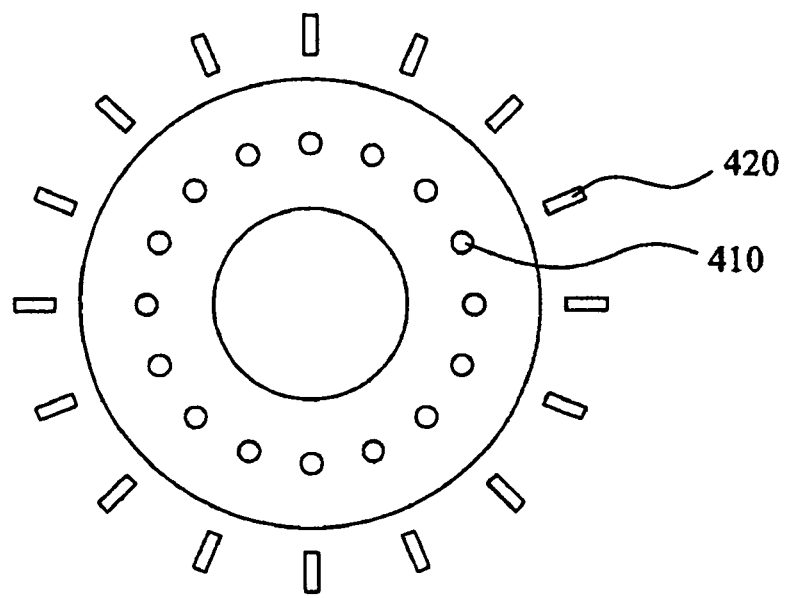
FIG. 4 is a diagram illustrating a digital device control apparatus according to an embodiment of the present invention.

FIG. 4 is a diagram illustrating a digital device control apparatus according to an embodiment of the present invention.

Referring to FIG. 4, the digital device control apparatus comprises a plurality of touch-sensitive switches separated from each other at a predetermined interval and light-emitting devices corresponding to the touch-sensitive switches. The touch-sensitive switches comprise a touch-sensitive switch 410 and the light-emitting devices comprise a light-emitting device 420.

In the embodiment illustrated in FIG. 4, the touch-sensitive switches are corresponding to the light-emitting devices in a one-to-one manner. However, as described above, the touch-sensitive switches may correspond to the light-emitting devices in a many-to-one manner or a one-to-many manner.

In the embodiment illustrated in FIG. 4, the light-emitting device 420 corresponding to the touch-sensitive switch 410 is located on the outer circumference of a circle along which the touch-sensitive switches are arranged. However, the light-emitting device 420 may be arranged differently from as illustrated in FIG. 4, as long as the light-emitting device 420 is located closer to the touch-sensitive switch 410 than other light-emitting devices. Accordingly, by emitting light from a light-emitting device 420 when the touch-sensitive switch 410 is touched, the user may be helped to visually recognize that the touch occurred at the touch-sensitive switch 410 in a clear manner.

In the embodiment illustrated in FIG. 4, the touch-sensitive switch 410 indicates any type of apparatus sensing a touch of a user relying on physical properties such as heat, pressure, capacitance, and resistance and converting the touch input into an electrical signal. The touch-sensitive switches may be sensitive to a direct contact with a part of a human body, as well as an indirect contact via a conductor or a nonconductor.

In the embodiment illustrated in FIG. 4, the light-emitting device 420 may be a light-emitting diode. The light-emitting device 420 may emit light while a relevant touch-sensitive switch 410 is being touched by the user. Accordingly, the user may recognize the touch-sensitive switch of a certain location where a touch is given. In another embodiment, the light-emitting device 420 may emit light for a predetermined period of time even after the touch is removed from the touch-sensitive switch 410. Accordingly, the user may recognize the path of the touch-sensitive switch that has been touched by the user, even when the touch has occurred for a very short period of time.

The light-emitting device 420 may emit light in various brightness and colors.

Figure 5:
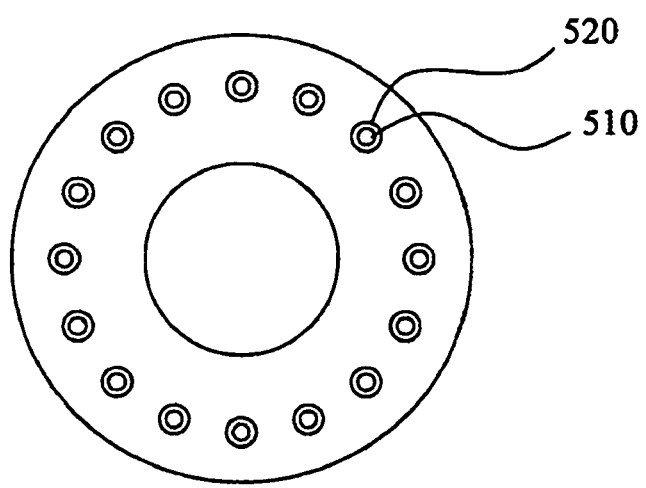
FIG. 5 is a diagram illustrating a digital device control apparatus according to another embodiment of the present invention.

FIG. 5 is a diagram illustrating a digital device control apparatus according to another embodiment of the present invention.

Referring to FIG. 5, the digital device control apparatus comprises a plurality of touch-sensitive switches separated from each other at a predetermined interval, and light-emitting devices corresponding to the touch-sensitive switches. The touch-sensitive switches comprise a touch-sensitive switch 510, and the light-emitting devices comprise a light-emitting device 520.

In the embodiment illustrated in FIG. 5, the touch-sensitive switches are corresponding to the light-emitting devices in a one-to-one manner. However, as described above, the touch-sensitive switches may correspond to the light-emitting devices in a many-to-one or a one-to-many manner.

In the embodiment illustrated in FIG. 5, the light-emitting device 520 surrounds the corresponding touch-sensitive switch 510. Therefore, when the touch-sensitive switch 510 is touched and the light-emitting device 520 emits light, the user may visually recognize that a touch has occurred on the touch-sensitive switch 510 in a clear manner.

The operations and the properties of the touch-sensitive switch 510 and the light-emitting device 520 in the embodiment illustrated in FIG. 5 are as described in the description of FIG. 4.

Figure 6:
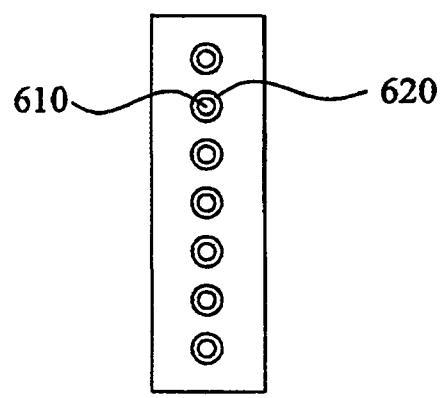
FIG. 6 is a diagram illustrating a digital device control apparatus according to still another embodiment of the present invention.

FIG. 6 is a diagram illustrating a digital device control apparatus according to still another-embodiment of the present invention.

Referring to FIG. 6, the digital device control apparatus comprises a plurality of touch-sensitive switches separated from each other at a predetermined interval, and light-emitting devices corresponding to the touch-sensitive switches. The touch-sensitive switches comprise a touch-sensitive switch 610, and the light-emitting devices comprise a light-emitting device 620.

In the embodiment illustrated in FIG. 6, the touch-sensitive switches are corresponding to the light-emitting devices in a one-to-one manner. However, as described above, the touch-sensitive switches may correspond to the light-emitting devices in a many-to-one or a one-to-many manner.

In the embodiment illustrated in FIG. 6, the light-emitting device 620 surrounds the corresponding touch-sensitive switch 610. As an example, the light-emitting device 620 may be located on any side of the touch-sensitive switch 610 so that the user may visually recognize in a clear manner that a touch has occurred on the touch-sensitive switch 610, by emitting a light from the light-emitting device 620 when the touch-sensitive switch 610 is touched.

In the embodiment illustrated in FIG. 6, the touch-sensitive switches are arranged in a bar-shape along the vertical line. In this embodiment, an upward rubbing of a finger moving from bottom to top of the touch-sensitive switches leads to an upward scroll of a screen, an upward movement of a pointer, or turning up of a volume. In a like manner, a downward rubbing from top to bottom of the touch-sensitive switches leads to a downward scroll of a screen, a downward movement of a pointer, or turning down of a volume.

The operations and the properties of the touch-sensitive switch 610 and the light-emitting device 620 in the embodiment illustrated in FIG. 6 are as described in the description of FIG. 4.

Figure 7:
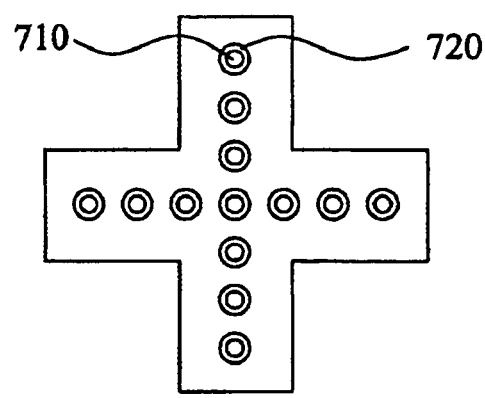
FIG. 7 is a diagram illustrating a digital device control apparatus according to yet another embodiment of the present invention.

FIG. 7 is a diagram illustrating a digital device control apparatus according to yet another embodiment of the present invention.

Referring to FIG. 7, the digital device control apparatus comprises a plurality of touch-sensitive switches separated from each other at a predetermined interval, and light-emitting devices corresponding to the touch-sensitive switches. The touch-sensitive switches comprise a touch-sensitive switch 710, and the light-emitting devices comprise a light-emitting device 720.

In the embodiment illustrated in FIG. 7, the touch-sensitive switches are corresponding to the light-emitting devices in a one-to-one manner. However, as described above, the touch-sensitive switches may correspond to the light-emitting devices in a many-to-one manner or a one-to-many manner.

In the embodiment illustrated in FIG. 7, the light-emitting device 720 surrounds the corresponding touch-sensitive switch 710. In an embodiment, the light-emitting device 720 may be located in any side of the touch-sensitive switch 710 so that the user may visually recognize in a clear manner that a touch has occurred on the touch-sensitive switch 710, by emitting a light from the light-emitting device 720 when the touch-sensitive switch 710 is touched.

In the embodiment illustrated in FIG. 7, the touch-sensitive switches are arranged in a cross-shape along a vertical line and a horizontal line. In this embodiment, an upward rubbing of a finger moving from bottom to top of the touch-sensitive switches leads to an upward scroll of a screen, an upward movement of a pointer, or turning up of a volume. In a like manner, a downward rubbing from top to bottom of the touch-sensitive switches leads to a downward scroll of a screen, a downward movement of a pointer, or turning down of a volume. Also, a rubbing of a finger from left to right of the touch-sensitive switches leads to a right scroll of a screen, moving of a pointer to the right, or moving to a menu on a right-hand side. In a like manner, a rubbing from right to left of the touch-sensitive switches leads to a left scroll of a screen, moving of a pointer to the left, or moving to a menu on a left-hand side.

The operations and the properties of the touch-sensitive switch 710 and the light-emitting device 720 in the embodiment illustrated in FIG. 7 are as described in the description of FIG. 4.

Figure 8:
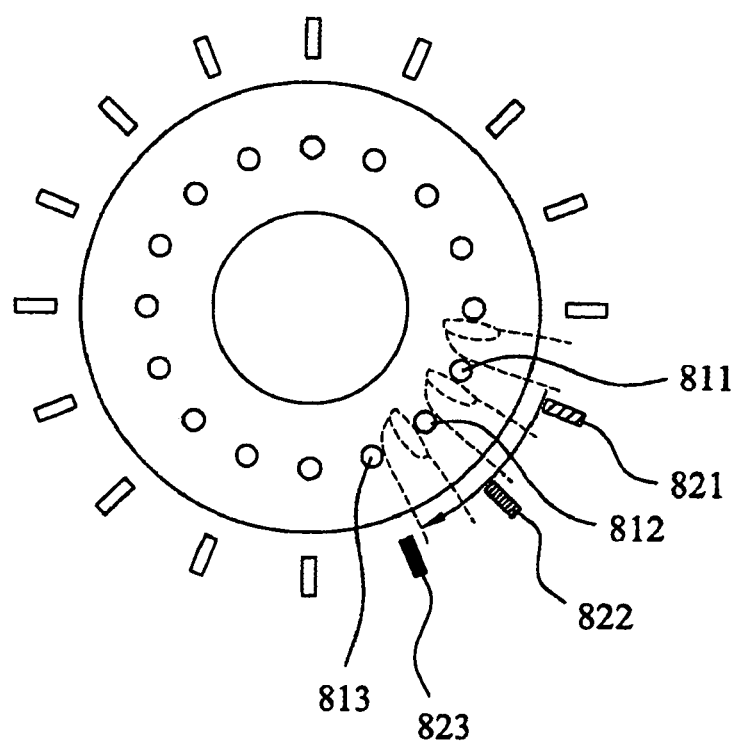
FIG. 8 is a diagram illustrating the operation of the digital device control apparatus illustrated in FIG. 4.

FIG. 8 is a diagram illustrating the operation of the digital device control apparatus illustrated in FIG. 4.

Referring to FIG. 8, a touch is sequentially generated on touch-sensitive switches 811, 812, and 813, in the digital device control apparatus. Accordingly, light-emitting devices 821, 822, and 823 each corresponding to the touch-sensitive switches 811, 812, and 813 sequentially emit light.

In this case, the light-emitting devices 821, 822, and 823 may emit light only for a time duration while a touch is being given to the touch-sensitive switches 811, 812, and 813, respectively. In another case, the light-emitting devices 821, 822, and 833 may emit light for a predetermined period of time even after the touch is removed from the touch-sensitive switches 811, 812, and 813.

The light-emitting devices 821, 822, and 823 may be light-emitting diodes, and may emit light in various colors or brightness.

Referring to FIG. 8, the light-emitting device 823 emits a bright light when a touch has occurred recently on the corresponding touch-sensitive switch 813, whereas the light-emitting device 821 emits a dim light when a long time has elapsed from the last touch on the corresponding touch-sensitive switch 811. As described above, by varying brightness of the relevant light-emitting device according to the time lapse from the last touch, a user may visually trace his/her own touch operation. Also, a light-emitting device which quickly emits light when a predetermined control signal is activated and which slowly fades out when the control signal is deactivated, may be employed, creating an afterimage effect. Furthermore, various other methods may be utilized such as controlling color as well as brightness, to support the afterimage effect.

For example, in a case the touch-sensitive switch senses a touch based on pressure, a high pressure on the touch-sensitive switch leads to a bright light emitted from the relevant light-emitting device, while a low pressure leads to a dim light emitted from the relevant light-emitting device.

A process may be added for providing a smoother visual impression to the user. As an example, a light-emitting area may be increased by diffusing, refracting, or reflecting light emitted by each light-emitting device, thereby providing a smoother impression to the user.

In the embodiment illustrated in FIG. 8, the light-emitting devices may emit different forms of light depending on not only the way of the user performs a touch on the touch-sensitive switch, but also the control state of the digital device. For example, all the light-emitting devices may blink at the same time when the digital device enters a certain mode of operation. For example, the light-emitting devices may blink while a start-up operation is being performed after power is supplied to the digital device.

Furthermore, the feedback information may enable the light-emitting devices to emit light in different forms even for the same touch, depending upon the control state of the digital device.

Though the embodiment illustrated in FIG. 8 is mainly described in association with the operation of the digital device control apparatus illustrated in FIG. 4, the operation described by FIG. 8 may be applied to the digital device control apparatuses illustrated in FIGS. 5 through 7.

Figure 9:
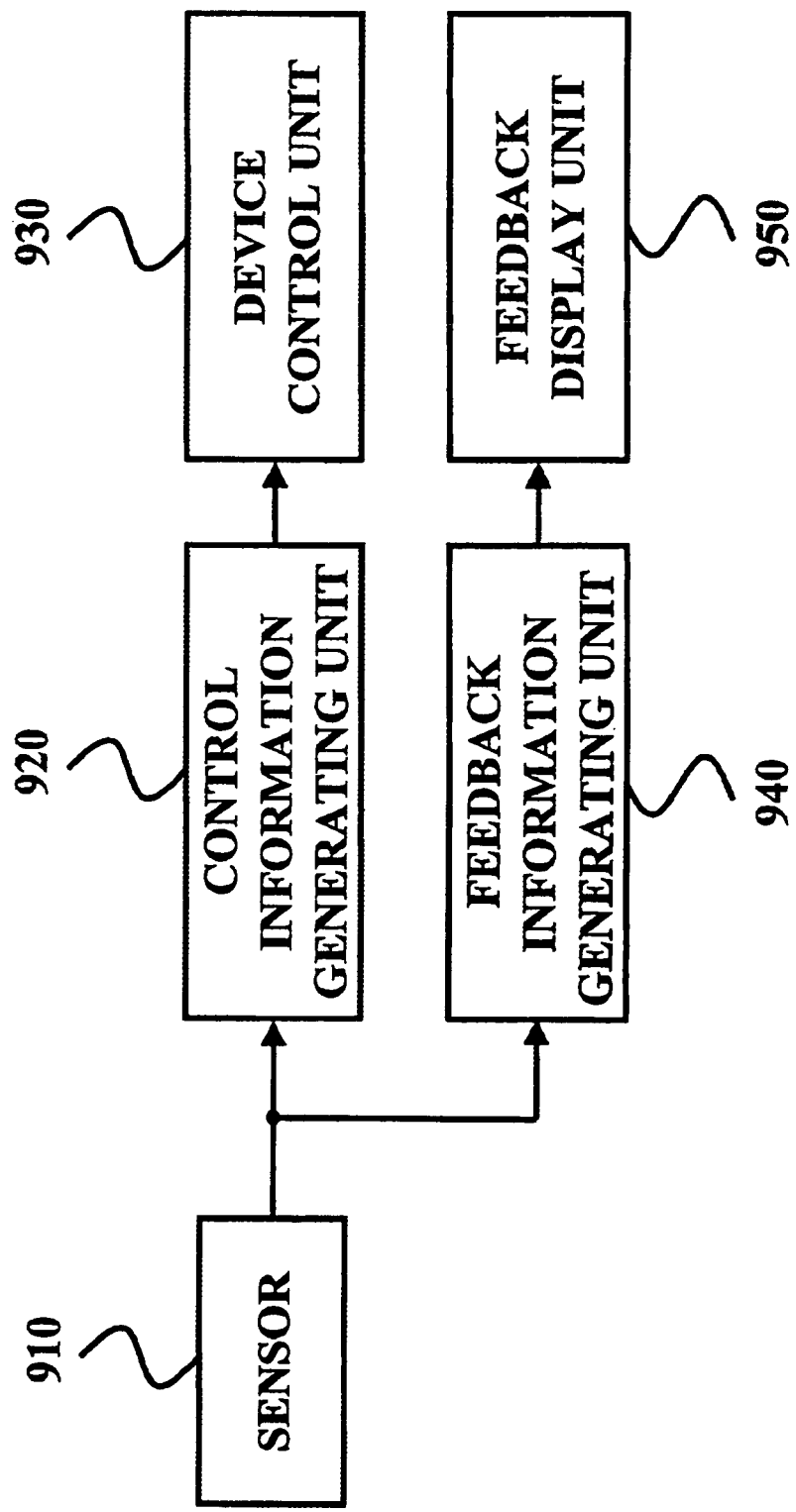
FIG. 9 is a block diagram illustrating the configuration of a digital device control apparatus according to an embodiment of the present invention.

FIG. 9 is a block diagram illustrating the configuration of a digital device control apparatus according to an embodiment of the present invention.

Referring to FIG. 9, the digital device control apparatus for controlling a digital device based on a touch input from a user, according to an embodiment of the present invention, comprises a sensor 910, a control information generating unit 920, a device control unit 930, a feedback information generating unit 940, and a feedback display unit 950.

The sensor 910 comprises a plurality of touch-sensitive switches separated from each other at a predetermined interval and generates touch information by sensing user's touch on the touch-sensitive switches.

The plurality of the touch-sensitive switches indicate any type of apparatus sensing a user's touch relying on physical properties such as heat, pressure, capacitance, and resistance and converting the touch input into an electrical signal. As described above, the touch-sensitive switches may be sensitive to a direct contact with a part of a human body, as well as an indirect contact via a conductor or a nonconductor. The touch-sensitive switch may sense the intensity of a touch.

The plurality of the touch-sensitive switches may be arranged in circular shape, a bar-shape, or a cross-shape, as illustrated in FIGS. 4 through 7. The user may control a digital device by rubbing his/her finger on the touch-sensitive switches.

The interval between the touch-sensitive switches may be configured with a different widths depending upon a type of applications or a degree of convenience provided to users. A narrower interval between the touch-sensitive switches may enable a fine control, while a wider interval and a decrease in a total number of the switches may contribute to a reduction of a production costs and easier routing between the switches.

The control information generating unit 920 generates control information for controlling a digital device based on the touch information.

The digital device may be a mobile device such as a mobile phone, a mobile multimedia player such as an MP3 player and a portable multimedia player (PMP), or a mobile game machine. Also, the digital device may be various kinds of electronic appliances, not limited to a mobile device.

The control information may include all sorts of control signals required in the operation of the digital device. For example, the control information may be used for controlling a display unit or a volume control unit of the digital device.

The device control unit 930 performs controlling of the digital device according to the control information generated.

In this case, the control of the digital device may be performed in many ways. For example, the digital device may be controlled based on a position where a user touches on, or by recognizing the movement of the touched position. For example, the user may move his/her finger up and down, or clockwise and counterclockwise, to scroll a screen up/down, move a pointer up/down, zoom the screen in/out, or turn the volume up/down.

The feedback information generating unit 940 generates feedback information based on the touch information.

In this case, the feedback information is for providing the touch information associated with a touch input of the user. For example, the feedback information may be a control signal for driving a light-emitting device based on the touch information. For example, in the case light-emitting devices corresponding to the touch-sensitive switches are arranged corresponding one-to-one to the touch-sensitive switches, the feedback information may be a control signal for lighting up the light-emitting devices corresponding to the touch-sensitive switches touched.

The feedback display unit 950 visually displays the feedback information to the user.

The feedback display unit 950 may display feedback information to the user by means of a plurality of light-emitting devices. In this case, the light-emitting devices may be light-emitting diodes. The light-emitting devices may emit various-colored light.

For displaying the feedback information, it is advantageous for a plurality of the light-emitting devices to be corresponding to a plurality of touch-sensitive switches. The operation of and correspondence relation between the touch-sensitive switches and the light-emitting devices are as described above.

The sensor 910 and the feedback information generating unit 940 may be embodied in a single chip. A single-chip embodiment reduces wiring between the sensor 910 and the feedback information generating unit 940, thereby integrating the digital device to a higher degree and preventing the circuit from being disconnected or short-circuited.

The feedback information generating unit 940 may be embodied by using a flexible printed circuit board (FPCB). The FPCB has a high workability, heat resistance, bending resistance, chemical resistance, and may contain three-dimensional wiring, thereby miniaturizing and reducing the weight of the feedback information generating unit 940.

Figure 10:
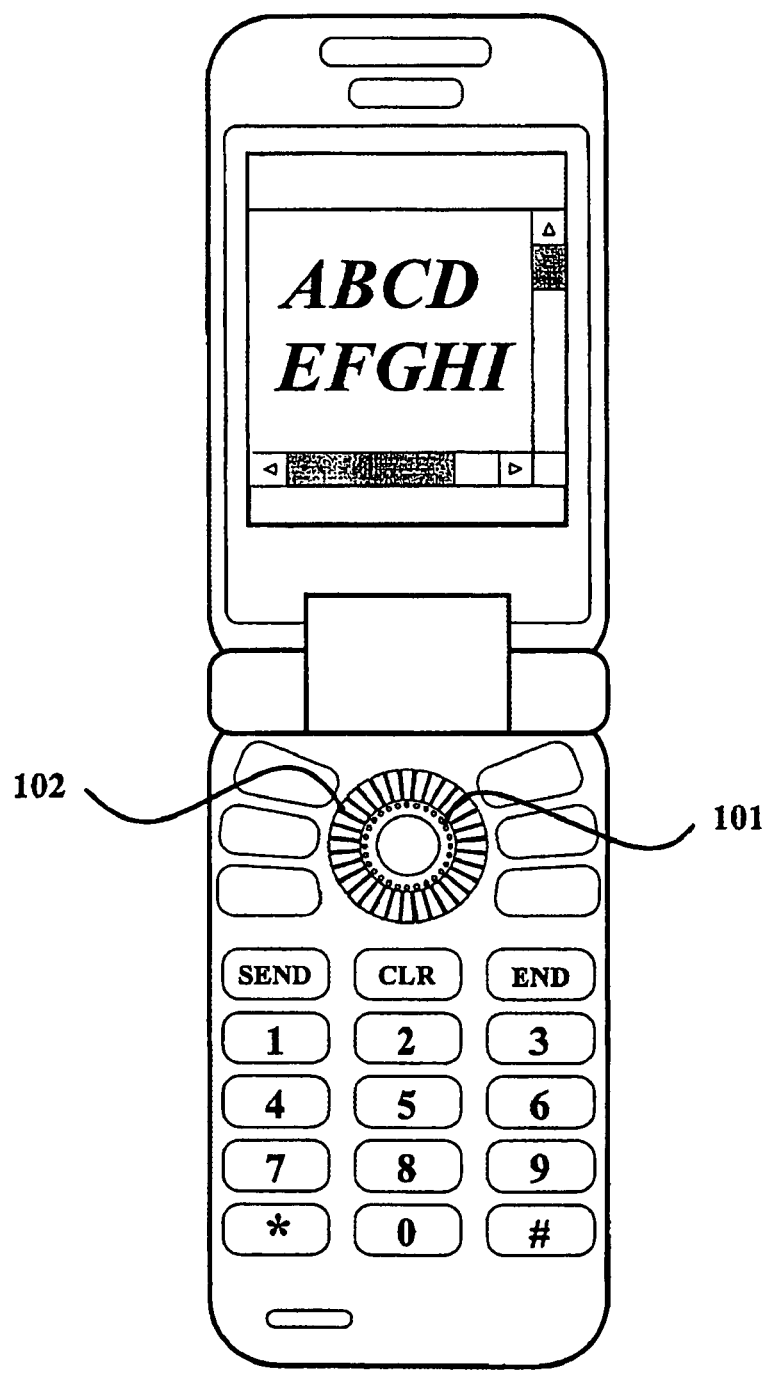
FIG. 10 is a diagram illustrating a mobile device according to an embodiment of the present invention.

FIG. 10 is a diagram illustrating a mobile device according to an embodiment of the present invention.

Referring to FIG. 10, the mobile device includes a sensor 101 and a plurality of light-emitting devices 102. Not shown in FIG. 10, the mobile device may comprise a control information generating unit, a device control unit, and a feedback information generating unit.

The sensor 101 comprises a plurality of touch-sensitive switches separated from each other at a predetermined interval, which sense user's touch on the touch-sensitive switches to generate touch information.

The plurality of the light-emitting devices 102 are corresponding to the plurality of the touch-sensitive switches comprised in the sensor 101, and visually display the feedback information to the user.

When the user touches the sensor 101 with a finger, for example, and moves, the control information generating unit and the device control unit operate to control the mobile device. For example, the user may move his/her finger up and down, or clockwise and counterclockwise, to scroll a screen up/down, move a pointer up/down, zoom the screen in/out, or turn the volume up/down. At the same time, the plurality of the light-emitting devices 102 give a visual feedback of the movement of the user's finger. For example, in the case the touch-sensitive switch senses a touch based on pressure, a high pressure on the touch-sensitive switch leads to a bright light emitted from the relevant-light-emitting device, while a low pressure leads to a dim light emitted from the relevant light-emitting device. In another case, a recent touch on a touch-sensitive switch leads to a bright light emitted from the relevant light-emitting device, and the light gets dimmer as time elapses since the last touch.

Accordingly, the present invention helps the user to visually recognize in a clear manner how he/she is operating a sensor comprising the touch-sensitive switches, thereby increasing convenience in operation, reducing operational failures, and makes it easier to recognize whether a failure in controlling the digital device is caused by a malfunction of the sensor 101 or caused by a malfunction of the control information generating unit or the device control unit.

The above-mentioned touch-sensitive switches or the light-emitting devices may be embodied in various forms. For example, the touch-sensitive switches or the light-emitting devices may be embodied in any of a circular-, oval-, fan-, and a rectangular-shape.

While this invention has been particularly shown and described with reference to preferred embodiments thereof, various changes in form and details may be made therein without departing from the spirit and scope of the invention as defined by the appended claims.

Therefore, the scope of the invention is defined not by the detailed description of the invention but by the appended claims, and all differences within the scope will be construed as being included in the present invention.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

The present invention provides a digital device control apparatus and digital device control method enabling a user to visually recognize a switching action of touch-sensitive switches in a clear manner, in a digital device where a user input is received by a plurality of touch-sensitive switches.

The present invention also provides a digital device control apparatus and digital device control method that is easily embodied in a miniaturized digital device and conveniently utilized by controlling the digital device with touch-sensitive switches that have corresponding light-emitting devices.

The present invention also provides a digital device control apparatus and digital device control method which helps a user to recognize whether a failure in controlling the digital device is caused by a malfunction of an input interface comprising touch-sensitive switches or caused by a malfunction of a device control unit. This is done by enabling a user to visually recognize a switching action of the touch-sensitive switches.

The invention claimed is:

1. A mobile device controlled by a touch input of a user, comprising:
   a sensor including a plurality of touch-sensitive switches separated from each other by a certain distance and sensing a touch of the user on the plurality of touch-sensitive switches for generating touch information;
   a database storing the touch information that includes a touch location and a time lapse from a last touch for each of the plurality of touch-sensitive switches;
   a control information generating unit generating control information for controlling the mobile device based on the touch information;
   a control unit controlling an operation of the mobile device according to the generated control information, the operation of the mobile device including a first mode of operation and a second mode of operation;
   a feedback information generating unit generating feedback information including a first feedback and a second feedback based on the touch information; and
   a plurality of light-emitting devices visually displaying the first feedback when the mobile device is in the first mode of operation and the second feedback when the mobile device is in the second mode of operation to the user corresponding to the plurality of the touch-sensitive switches, wherein each of the plurality of light-emitting devices surrounds the corresponding one of the plurality of touch-sensitive switches and is separate from the screen of the mobile device.

2. The device of claim 1, wherein each of the light-emitting devices is a light-emitting diode.

3. The device of claim 2, wherein each of the plurality of light-emitting devices surrounds the corresponding touch-sensitive switch.

4. The device of claim 1, wherein each of the plurality of light-emitting devices corresponds to one of the plurality of touch-sensitive switches in a one-to-one manner.

5. An apparatus for controlling a digital device based on a touch input of a user, comprising:
   a plurality of touch-sensitive switches separated from each other by a certain distance, wherein each of the plurality of touch-sensitive switches is configured to sense a touch of the user on the touch-sensitive switch for generating touch information corresponding to the touch-sensitive switches touched by the user;
   a database storing the touch information that includes a touch location and a time lapse from a last touch for each of the plurality of touch-sensitive switches, wherein the touch information includes a movement information of the touch based on the touch locations of the plurality of touch-sensitive switches;
   a plurality of light-emitting devices separated from each other by a certain distance, wherein each of the plurality of light-emitting devices corresponds to one of the plurality of touch-sensitive switches in a one-to-one manner, and wherein each of the plurality of light-emitting devices surrounds the corresponding one of the plurality of touch-sensitive switches;
   a feedback information generating unit configured to generate feedback information based on the movement information of the touch from the touch-sensitive switches touched by the user, wherein the feedback information comprises a control signal for driving the light-emitting device that corresponds to the touch-sensitive switch touched by the user; and
   a feedback display unit configured to visually display the feedback information to the user by driving the light-emitting device that corresponds to the touch-sensitive switch touched by the user.

6. The apparatus of claim 5, wherein the plurality of light-emitting devices are light-emitting diodes.

7. The apparatus of claim 5, wherein each of the plurality of light-emitting devices surrounds the corresponding one of the plurality of touch-sensitive switches.

8. The apparatus of claim 5, wherein the light-emitting devices emit light with respect to the time when the user touches the relevant touch-sensitive switches.

9. The apparatus of claim 5, wherein the light-emitting devices emit light in different brightness or different colors according to the touch information.

10. The apparatus of claim 5, wherein the feedback information is determined according to a control state of the digital device.

11. The apparatus of claim 5, wherein the sensor and the feedback information generating unit are embodied in a single chip.

12. The apparatus of claim 5, wherein the feedback information generating unit is embodied in a flexible printed circuit board (FPCB).

13. The apparatus of claim 5, wherein the feedback information comprises a control signal for turning off the light-emitting device that corresponds to the touch-sensitive switch touched by the user responsive to the user no longer touching the touch-sensitive switch.

14. The apparatus of claim 5, wherein the feedback display unit is further configured to, responsive to the user touching a second, separate one of the plurality of touch-sensitive switches, visually display the feedback information to the user by driving a second, separate one of the light-emitting devices that corresponds to the second touch-sensitive switch touched by the user.

15. The apparatus of claim 5, wherein the plurality of light-emitting devices are arranged in a cross-shape along a vertical line and a horizontal line.

16. The apparatus of claim 15, wherein a rubbing of a finger from a top one of the touch-sensitive switches to a bottom one of the touch-sensitive switches results in at least one of a downward scroll of a screen, a downward movement of a pointer, and a turning down of a volume.

17. The apparatus of claim 5, wherein the plurality of light-emitting devices are located on an outer circumference of a circle along which the plurality of touch-sensitive switches are arranged.

18. A method of controlling a digital device based on a touch input of a user, the method comprising the steps of:
   generating touch information by sensing a touch of the user on a plurality of touch-sensitive switches that are separated from each other by a certain distance;
   storing a touch location and a time lapse from a last touch for each of the plurality of touch-sensitive switches;
   generating control information for controlling the digital device based on the touch information;

controlling an operation of the digital device according to the generated control information, the operation of the digital device including a first mode of operation and a second mode of operation;

generating feedback information including a first feedback and second feedback based on the touch information; and visually displaying the first feedback information when the mobile device is in the first mode of operation and the second feedback when the mobile device is in the second mode of operation to the user by driving a plurality of light-emitting devices, each of which surrounds the corresponding one of the plurality of touch-sensor switches.

19. The method of claim 18, wherein, in the step of visually displaying the feedback information to the user, the feedback information is displayed using a second, separate one of the plurality of light-emitting devices corresponding to a second, separate one of the plurality of touch-sensitive switches.

20. The method of claim 19, wherein the first and second ones of the plurality of light-emitting devices are located within a predetermined range from the first and ones of the plurality of touch-sensitive switches, respectively.

21. A non-transitory computer-readable recording medium in which a program for executing the method according to claim 18 is recorded.

* * * * *